(12) United States Patent
Dyor et al.

(10) Patent No.: US 10,990,701 B2
(45) Date of Patent: *Apr. 27, 2021

(54) CONTENT CUSTOMIZATION WITH SECURITY FOR CLIENT PREFERENCES

(71) Applicant: Microsoft Technology Licensing, LLC, Redmond, WA (US)

(72) Inventors: Matthew Graham Dyor, Bellevue, WA (US); Richard J. Qian, Sammamish, WA (US); Marc Eliot Davis, San Francisco, CA (US); Steven William Macbeth, Redmond, WA (US); Lili Cheng, Bellevue, WA (US); Gur Kimchi, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 863 days.

This patent is subject to a terminal disclaimer.

(21) Appl. No.: 15/266,097

(22) Filed: Sep. 15, 2016

(65) Prior Publication Data

US 2017/0004332 A1 Jan. 5, 2017

Related U.S. Application Data

(63) Continuation of application No. 13/039,174, filed on Mar. 2, 2011, now Pat. No. 9,519,717.

(51) Int. Cl.
*G06F 16/248* (2019.01)
*G06F 16/9535* (2019.01)
(Continued)

(52) U.S. Cl.
CPC ........ *G06F 21/6263* (2013.01); *G06F 16/248* (2019.01); *G06F 16/958* (2019.01); *G06F 16/9535* (2019.01)

(58) Field of Classification Search
CPC ............ G06F 21/6363; G06F 16/9535; G06F 16/958; G06F 16/248
(Continued)

(56) References Cited

U.S. PATENT DOCUMENTS 6,721,781 B1 * 4/2004 Bates .................... G06F 16/955
709/203
7,069,271 B1 * 6/2006 Fadel ..................... G06Q 10/00
705/26.62
(Continued)

OTHER PUBLICATIONS

NPL "Internet Archive Wayback Machine"; URL https://web.archive.org/web/20090202091157/http://www.microsoft.com/en/us/default.aspx; publishehd Feb. 2009; 5pages; downloaded Nov. 2019 (Year: 2009).*
(Continued)

*Primary Examiner* — Henry Orr
(74) *Attorney, Agent, or Firm* — Schwegman Lundberg & Woessner, P.A.

(57) ABSTRACT

Techniques for content customization with security for client preferences are described herein. The techniques describe the customization of content provided by websites according to preferences, such as the interests, "likes" and demographic and/or geographic information of users. Additional techniques describe aspects of keeping the users' preferences secure from the website, so that the users' privacy and anonymity are protected. In one implementation, a "trusted entity" is trusted by users to obtain and store the preferences. Content may be obtained by the trusted entity from a content provider, such as a website. The content may be changed according to the preferences. The content is then provided to the users. In view of the changes made by the trusted entity, the user enjoys a customized version of the content. Addi-
(Continued)

tional techniques describe limits to customization, based on permissible customizations and frameworks generated by the content providers.

14 Claims, 7 Drawing Sheets

(51) Int. Cl.
*G06F 21/62* (2013.01)
*G06F 16/958* (2019.01)

(58) Field of Classification Search
USPC .......................................................... 715/747
See application file for complete search history.

(56) References Cited

U.S. PATENT DOCUMENTS

| | | | | |
|---|---|---|---|---|
| 7,162,526 | B2* | 1/2007 | Dutta | H04L 29/06 704/270 |
| 7,603,619 | B2 | 10/2009 | Baugher | |
| 7,979,457 | B1* | 7/2011 | Garman | G06Q 10/02 707/768 |
| 2004/0044590 | A1* | 3/2004 | Voorhees | G06Q 30/02 705/27.2 |
| 2004/0117490 | A1 | 6/2004 | Peterka et al. | |
| 2004/0158584 | A1* | 8/2004 | Necsoiu | G06F 16/29 |
| 2004/0167989 | A1* | 8/2004 | Kline | G06F 16/958 709/245 |
| 2005/0071328 | A1* | 3/2005 | Lawrence | G06F 16/9535 |
| 2005/0222989 | A1* | 10/2005 | Haveliwala | G06F 16/9535 |
| 2006/0190308 | A1* | 8/2006 | Janssens | G06Q 10/02 705/5 |
| 2006/0294199 | A1 | 12/2006 | Bertholf | |
| 2007/0050253 | A1 | 3/2007 | Biggs et al. | |
| 2007/0100701 | A1* | 5/2007 | Boccon-Gibod | G06F 21/10 705/21 |
| 2007/0208751 | A1* | 9/2007 | Cowan | G06Q 10/10 |
| 2007/0214237 | A1* | 9/2007 | Stibel | G06F 16/9537 709/217 |
| 2007/0226275 | A1* | 9/2007 | Ruul | G06F 16/9535 |
| 2007/0299985 | A1 | 12/2007 | Craig et al. | |
| 2007/0300152 | A1* | 12/2007 | Baugher | G06Q 30/0243 715/210 |
| 2008/0294603 | A1* | 11/2008 | Ranjan | G06Q 10/10 |
| 2009/0085878 | A1* | 4/2009 | Heubel | G06F 3/016 345/173 |
| 2009/0164924 | A1* | 6/2009 | Flake | G06F 16/9535 715/764 |
| 2009/0248680 | A1* | 10/2009 | Kalavade | G06Q 30/0267 |
| 2009/0249188 | A1 | 10/2009 | Dube et al. | |
| 2009/0287659 | A1* | 11/2009 | Bennett | G06F 16/9537 |
| 2009/0322673 | A1* | 12/2009 | Cherradi El Fadili | G06F 3/017 345/157 |
| 2010/0030597 | A1* | 2/2010 | Lewis, Jr. | G06Q 30/02 705/14.61 |
| 2010/0057560 | A1* | 3/2010 | Skudlark | G06Q 30/02 705/14.49 |
| 2010/0125605 | A1* | 5/2010 | Nair | H04L 63/102 707/784 |
| 2010/0180029 | A1* | 7/2010 | Fourman | G06F 21/60 709/225 |
| 2010/0231612 | A1* | 9/2010 | Chaudhri | G06F 3/04886 345/684 |
| 2010/0293058 | A1* | 11/2010 | Maher | G06Q 30/02 705/14.66 |
| 2010/0312572 | A1* | 12/2010 | Ramer | G06Q 30/02 705/1.1 |
| 2011/0106895 | A1* | 5/2011 | Ventilla | G06Q 10/10 709/206 |
| 2011/0119700 | A1* | 5/2011 | Hamilton | H04N 21/25883 725/32 |
| 2011/0295661 | A1* | 12/2011 | Dodge | G06Q 30/0241 705/14.4 |
| 2012/0042020 | A1* | 2/2012 | Kolari | G06Q 10/107 709/206 |
| 2012/0110052 | A1* | 5/2012 | Smarr | H04W 4/21 709/201 |
| 2012/0179980 | A1* | 7/2012 | Whalin | H04W 4/21 715/753 |
| 2012/0226995 | A1 | 9/2012 | Kimchi et al. | |

OTHER PUBLICATIONS

Designing, Localizing, and Customizing Web-based Embedded Assistance Published Date: DeLoach, "Designing, Localizing, and Customizing Web based Embedded Assistance" Jul. 10-13, 2005, http://www.clickstart.net/presentations/IPCC05_DeLoach.pdf, 5 pages.
Office action for U.S. Appl. No. 13/039,174, dated Feb. 25, 2016, Kimchi et al., "Content Customization with Security for Client Preferences", 26 pages.
Office action for U.S. Appl. No. 13/039,174, dated Mar. 17, 2015, Kimchi et al., "Content Customization with Security for Client Preferences", 34 pages.
Office Action for U.S. Appl. No. 13/039,174, dated Jul. 17, 2014, Gur Kimchi, "Content Customization with Security for Client Preferences", 27 pages.
Office action for U.S. Appl. No. 13/039,174, dated Jul. 18, 2013, Kimchi et al., "Content Customization with Security for Client Preferences", 28 pages.
Office action for U.S. Appl. No. 13/039,174, dated Aug. 27, 2015, Kimchi et al., "Content Customization with Security for Client Preferences", 31 pages.
Office action for U.S. Appl. No. 13/039,174, dated Sep. 6, 2012, Kimchi et al., "Content Customization with Security for Client Preferences", 21 pages.
Template-Based Website Design vs. Custom Website Design, Published Date: Jun. 7, 2010, http://www.socalwebworx.com/wordpress/template-based-website-design-vs-custom-website-design/, The following reference seems to be relevant to this disclosure. We have made our best efforts to get the publication date, however were not able to ascertain the same. We have noted the date on which we retrieved the reference. 4 pages.
Website Template Retrieved Date: Oct. 28, 2010 http://www.templatemonster.com/website-templates.php, 2 pages.
Template Based Web Design Retrieved Date: Oct. 28, 2010 http://www.tremblefish.com/tempdesign.htm, 1 page.
Web Site Customization? Personalize Look and Feel? Pros and Cons, Retrieved Date Oct. 28, 2010 http://www.masternewmedia.org/news/2008/02/01/web_site_customization_personalize_look.htm, 14 pages.

* cited by examiner

CONTENT CUSTOMIZATION WITH SECURITY FOR CLIENT PREFERENCES

RELATED APPLICATIONS

This application claims priority to and is a continuation of U.S. patent application Ser. No. 13/039,174, filed on Mar. 2, 2011, the entire contents of which are incorporated herein by reference.

BACKGROUND

Websites managers have long desired a method to provide customized content to different clients and/or users. In part, the underlying motivation is to be all things to all people, and to thereby achieve greater recognition and acclaim, increased utilization by the public and greater commercial profit. Not surprisingly, these are difficult goals.

Recognizing that customization requires information about the preferences of each user, many websites have gone directly to their users for that information. In particular, some websites have provided each individual user with opportunities to provide the website with information about one's self and to use that information to customize the presentation of the website for the individual user. A typical scenario is to ask the user to create an account, log into that account, and provide personal information. The user may provide such information because of a desire to obtain more relevant content on the website, and to save time and effort required to find such content.

Not surprisingly, many users decline to create such an account. Reasons for this include the onerous effort of providing demographic information, geographic information, interest information, and other information. Even users who do not mind the loss of privacy object to the tedious processes involved. However, a significant portion of the population is actively concerned with privacy. These concerns may be based on philosophy, or more pragmatically, on fear of a criminal scam. Accordingly, while websites attempt to personalize their content and to achieve wider popularity, such attempts have had mixed success, as people continue to protect their information.

SUMMARY

Techniques for content customization with security for client preferences are described herein. The techniques describe the customization of content provided by websites using preferences of the user, including for example, the "likes" or the interests of the user. Additional techniques describe aspects of keeping the user's preferences secure from the website, so that the user's privacy and/or anonymity are protected.

A content customization process with security for client preferences may present customized content to users while keeping their preferences unavailable to a content provider. In one implementation, a "trusted entity" is trusted by users to obtain and store preferences, such as interests, "likes," demographic, geographic and/or other information of the users. Content may be obtained by the trusted entity from a content provider, such as a website. The content may be changed according to the preferences while keeping the preferences unavailable to the content provider. The content is then provided to the user. In view of the changes made by the trusted entity, the user enjoys a customized version of the content. However, the user's preferences are not shared by the trusted entity with any content provider and/or website.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to device(s), system(s), method(s) and/or computer-readable instructions as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Figure 1:
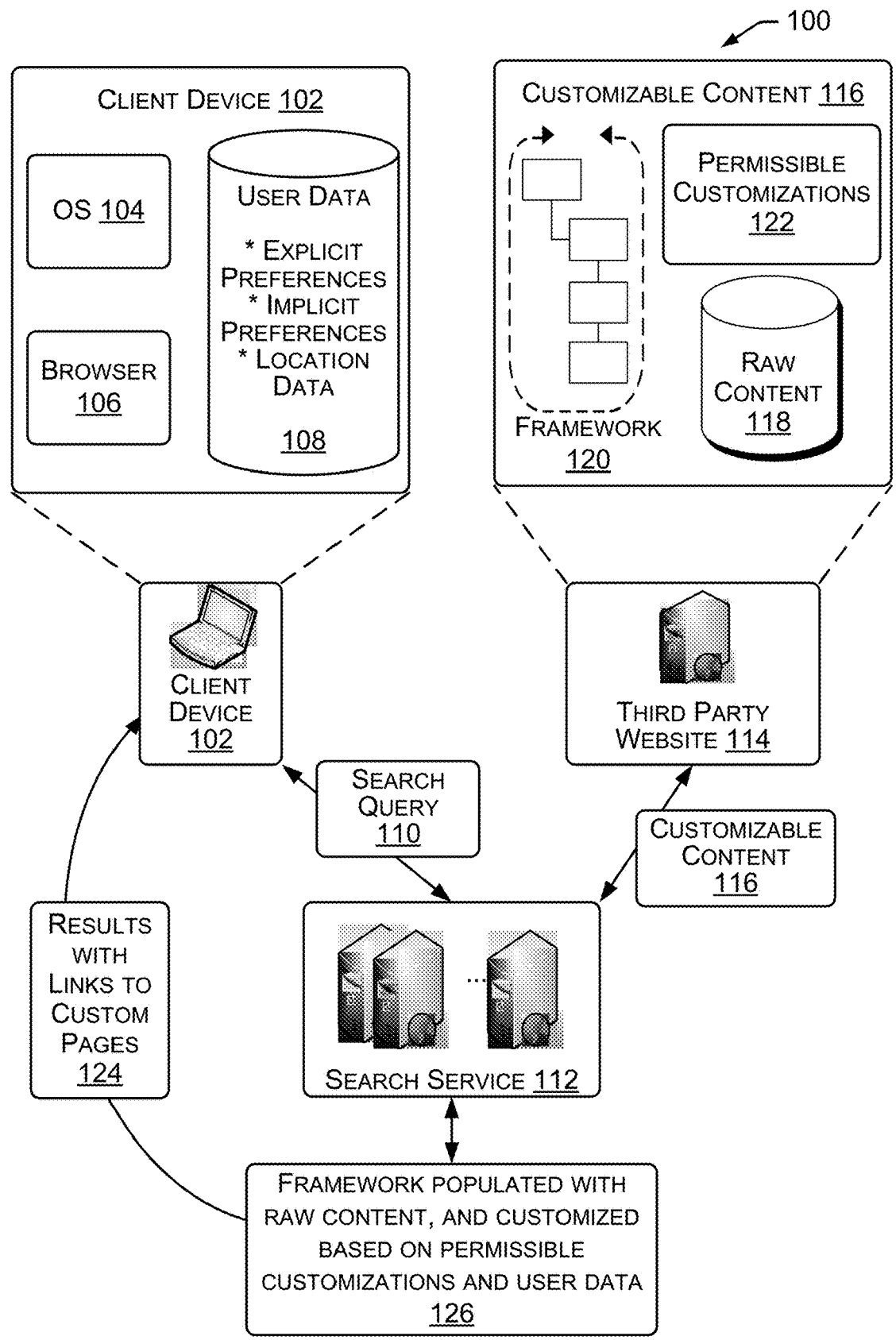
FIG. 1 is a diagram illustrating an example system providing content customization with security for client preferences.

The disclosure describes examples of techniques for providing content customization with security for client and/or user preferences. The techniques describe examples by which preferences may be obtained from a user. Additional techniques describe examples by which content may be obtained from a content provider, such as a website. Further techniques describe examples by which the content may be changed according to the preferences, without communicating the preferences to the content provider. And still further techniques describe examples by which a content provider may impose permissible customizations to limit a degree to which content may be changed according to the preferences.

An example illustrating some of the techniques discussed herein—not to be considered a full or comprehensive discussion—may assist the reader. Preferences may be obtained from the user. The preferences may include information about the user, such as the user's interests and "likes," as well as demographic and geographic information about the user, such as a location of the user and/or a location of the user's home, work and/or school. The user's "likes" can include indications of the user's interests, such as sports, hobbies, news, music, movies, video games, celebrity gossip and many others. Content may be obtained from a content provider, such as a website, network, publisher, studio, channel or other content source. The content may be changed according to the preferences. In one example, content consistent with the preferences of the user may be utilized, while content inconsistent with the preferences of the user can be minimized and/or eliminated. The changed content may then be presented to the user.

The discussion herein includes several sections. Each section is intended to be a non-limiting example, and does not describe required features and/or embodiments. More particularly, this entire description is intended to illustrate components which may be utilized in providing content customization with security for client preferences, but not components which are necessarily required. The discussion begins with a section entitled "Example Content Customization Systems," which describes an example application of the techniques described herein. This section depicts and describes content customization with security for client preferences and an example environment within which content and preferences are obtained, the content is changed according to the preferences and the changed content is provided to the user. Next, a section entitled "Example User Interface" illustrates and describes an example user interface configured to provide a user with links to both content changed according to the user's preferences and also to content that is unchanged. A further section, entitled "Example Flow Diagrams" illustrates and describes techniques that may be used to provide content customization to users, while providing security for preferences of the users. Finally, the discussion ends with a brief conclusion.

This brief introduction, including section titles and corresponding summaries, is provided for the reader's convenience and is not intended to limit the scope of the claims or any section of this disclosure.

Example Content Customization Systems

FIG. 1 is a diagram illustrating a system 100 providing content customization with security for client preferences. The system 100 additionally provides constraints, which may be used to regulate a degree to which content may be customized. In one example of the system 100, a client device is configured for communication with a search engine and/or service. A user, operating the client device, may submit a query to the search engine. The search engine may analyze the query and identify a third party website as being consistent with a response to the query. In addition to its search engine functionality, the search service may be a "trusted entity," and as such, may be entrusted to possess preferences of the user. Using those preferences, the search engine may customize content obtained from the third party website to better suit the user. Thus, FIG. 1 shows aspects of content customization in a manner that provides security for client preferences. In some examples, the customization may be restricted according to a range of permissible customizations allowed by the content provider.

Referring again to FIG. 1, the example system 100 is configured to provide a client access to customized content while providing security for client preferences used to customize the content. A client device 102 is typically operated by a user, i.e. an individual. The individual may prefer some content, information, topics and/or presentations methods, styles or formats over others. The client device 102 may be configured with an operating system 104 and other software, as required for operation. In particular, a browser 106 or other communication software may be utilized to provide access over a network, such as the Internet. The client device 102 may also be configured with, and/or obtain, user data 108. In one example, the user data 108 may include preferences of the user or individual operating the client device 102. The terms "preferences" and "user preferences" may be considered, without limitation, to refer to any preferences, "likes," "dislikes," or information about the user. Such information may include explicit user preferences, such as those preferences actually and deliberately indicated by the user. The preferences or information may also include implicit preferences, which may be derived from actions by the user that may not have been consciously intended by the user to express an opinion or preference. For example, a user's interaction with the user's mailbox may indicate a preference to a "clean" and/or "tidy" appearance. Such interaction may be used to infer a preference for websites and webpages having a clean and tidy, rather than cluttered or crowded, design. The preferences may include demographic information, such as the user's age, sex, occupation or other information. The preferences may also include location data, such as the user's home location, school location, business or job location, or the user's present location, etc.

The client device 102 is configured, such as by operation of the browser 106, to create a search query 110, which may be sent to the search service 112. The search query 110 is typically one or more words of text, but may be data such as data representing voice, a song or an image, etc.

The search service 112 may include search engine functionality, and may perform a search of a singular or composite data store in response to receipt of the search query 110. In one example, the search service 112 searches the Internet (not shown for clarity) for matches and/or appropriate return information corresponding to the search query 110.

The search service 112 may additionally be configured to receive and process the user data 108. As indicated above, the user data 108 may include explicit and/or implicit user preferences, user "likes" or "dislikes," demographic and geographic information, etc. The search service 112 may utilize the user data 108 to customize content from one or more third party web sites 114. When the search service uses the user data (user preferences) 108 with more than one third party website 114, the user of the client device 102 benefits by not having to repeatedly enter data into a plurality of websites. Some limitations on the degree to which content may be customized may be imposed by the third party website(s) 114.

Thus, the search of the Internet may discover website(s) such as the third party website 114 (third party, in that it is distinct from the client device 102 and the search service 112). The third party web site 114 may include customizable content 116. The customizable content 116 may include raw content 118 (e.g., text, images, audio, video, multimedia and/or other data). Additionally, the customizable content 116 may include a framework 120 upon which the raw content 118 may be organized. The framework 120 may include information that formats and/or arranges the content in one or more required or optional manners. For example, the framework 120 may organize, order, arrange, integrate, separate and/or otherwise manage or control placement, format or other factors regarding the display of the raw content 118.

Optionally, permissible customizations 122 may be utilized to provide the third party website 114 with a desired amount of control over display of the raw content 118. The permissible customizations 122 may include rules and/or a required format or organization that limits a degree to which display of the raw content 118 may be modified, according to user preferences, from an original intent. Accordingly, the third party website 114 may use the permissible customizations 122 to control, or partially control, an appearance of the raw content 118 when displayed by the browser 106 of the client device 102. In one example, the permissible customizations 122 require that the raw content 118 be displayed on the framework 120, while leaving one or more aspects of the arrangement and/or inclusion/exclusion of elements of the raw content on the framework up to the search service 112 and/or the browser 106 of the client device 102. Thus, the constraints imposed by the permissible customizations 122 and/or the framework 120 may provide a structure upon which raw content 118 may be connected. Within the constraints of the permissible customizations 122, the relative positions of different elements of raw content 118 and/or their relative size and appearance can be governed by the framework 120. And within the constraints of the permissible customizations 122, the framework 120 may allow one or more subsets of the raw content 118 to be utilized.

Thus, the permissible customizations 122 may govern display of the raw content 118 within the framework 120, and require that the raw content and the framework be utilized in a particular manner. In a still further alternative, the permissible customizations 122 may require that the raw content 118 be displayed on one of a plurality of frameworks 120, but leave a choice of which framework to the search service 112 and/or the client device 102.

If the search service 112 determines that the customizable content 116 of the third party web site 114 is consistent with the search query 110, the search service 112 may include a reference (e.g., a link) to the customizable content among the results 124 of the search. The search results 124 may also contain links to non-customized webpages, websites and other information.

In response to the user's search request/query 110, the user may be provided with the search results 124. The search results 124 may include links to custom pages (which may not be created until requested by the user) and non-custom pages, provided the third party website and/or other websites and entities.

Upon request by the user, the search service 112 may create a custom version of the webpage for the user. For example, a populated framework 126 may be created, based on the customizable content 116, the user's preferences 108, the framework(s) 120 and the permissible customizations 122. Thus, in response to a request by the user on a link in search results 124, the search service 112 may request the customizable content 116 from the third party web site 114 and produce a customized page, such as by creation of the populated framework 126.

Figure 2:
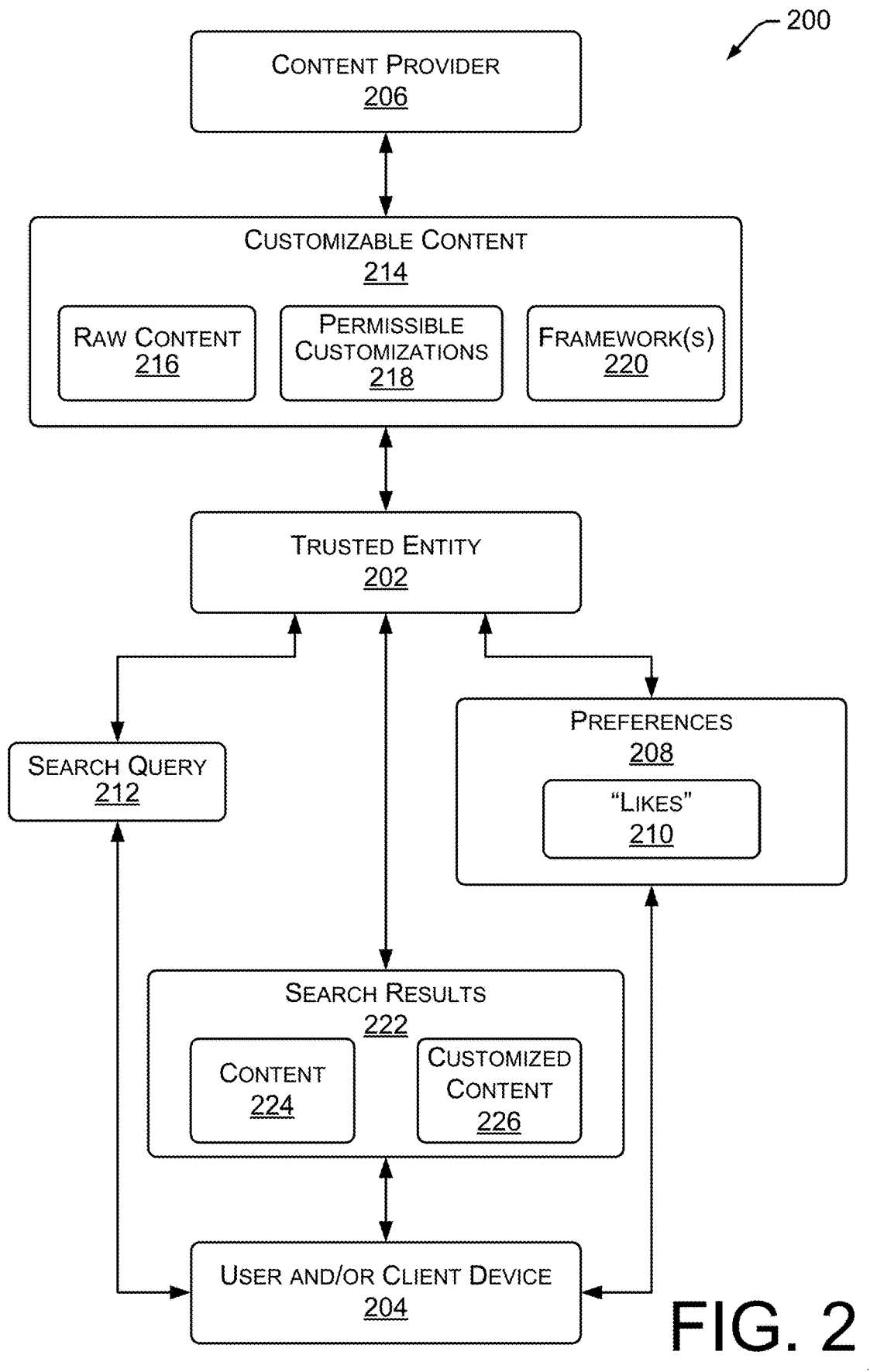
FIG. 2 is a diagram illustrating an example system, wherein content consistent with user's preferences is provided, the user's preferences are maintained in confidence, and content providers' constraints on customization are observed.

FIG. 2 is a diagram illustrating an example system 200, wherein content may be modified in a manner consistent with user's preferences, the user's preferences are maintained in confidence, and content providers' constraints on customization are observed. The diagram shows an example of a relationship between a content provider, a trusted entity and a user. In particular, the diagram shows how a trusted entity may reconcile the needs of the user to safeguard privacy of the user's preferences, while still creating customized content for the user. The example system 200 additionally shows that optional constraints on customization may be imposed by content providers, to thereby limit a degree to which raw content may be modified and/or a degree to which a format by which the content is displayed can be altered.

In one example of the system 200, a trusted entity 202 is configured for communication with a user and/or client device 204 and for communication with one or more content providers 206. The trusted entity 202 may be configured to receive user preferences 208. The preferences 208 may include explicit preferences, implicit preferences, location data and demographic data. The preferences 208 may also include the "likes" 210 of the user, and any other information helpful to customize content in a manner that is acceptable and/or preferable to the user.

In the example system 200, the trusted entity 202 is illustrated as being a separate entity, optionally combined with search engine functionality. Alternatively and/or additionally, the trusted entity 202 may be combined with the client device 204 or may be combined with the content provider 206.

The trusted entity 202 may be configured to receive a search query (search request) 212 from the client device 204. If the trusted entity 202 is configured for combination with a search engine, to thereby constitute a more functional search service, the search query may be received by the search engine of the trusted entity. If the trusted entity 202 does not have an available integrated search engine capacity, then the search query 212 may be sent to a distinct search engine (not shown). In either case, the trusted entity 202 may identify the content provider 206 as an appropriate match to the search query 212 sent by the client device 204. In response, a request, i.e., a "hit," for a webpage may be sent to the content provider 206.

The content provider 206 may be configured to receive a "hit" for a webpage, and to serve that webpage. However, the "hit," or request for a webpage, may contain an indication that the trusted entity 202 would like to customize the webpage. Accordingly, the content provider 206 may be configured to respond to the hit with customizable content 214. The customizable content may include some restrictions on a degree to which the content may be customized. For example, the customizable content may include one or more of the following: raw content 216; permissible customizations 218; and one or more frameworks 220.

The raw content 216 may include text, images, audio, video, and/or other content, including font and display information. The permissible customizations 218 may include restrictions on allowable display formats, display rules and/or other limitations on how the content may be displayed and/or utilized by the client device 204. Display of certain portions of the raw content 216 may be required, while display of other portions of the raw content may be optional. The ordering of certain portions of the raw content may be fixed and/or optional or flexible. The restrictions and/or limitations may be expressed positively and/or negatively. For example, positive restrictions may express a choice of what display formats, arrangements, content orderings and/or deletions, etc., are allowed. Negative restrictions may express changes which are not allowed, leaving other changes as options for use when displaying the content on the client device. As an example, a restriction may require a certain advertisement in a certain location.

The framework(s) 220 may include a data structure or other device suitable to impose a format and/or arrangement of content objects from among the raw content 216. Thus, the framework 220 may be used in conjunction with the permissible customizations 218 to arrange the raw content 216 into a format that includes content of interest to the user/client and that is presented in a manner attractive to the user/client.

The trusted entity 202 is configured, upon receipt of, or indication of availability of, the customizable content 214, to produce search results 222 for presentation to the client device 204. The search results 222 may include either content or links to content. Additionally, the search results 222 may include, and/or link to, content 224 and customized content 226, i.e., content that has not been, and has been, customized. In one example, any customizations may be performed according to the permissible customizations 218 and framework(s) 220. The customizations may be performed after activation of a link to customized content by the user.

Example User Interface

Figure 3:
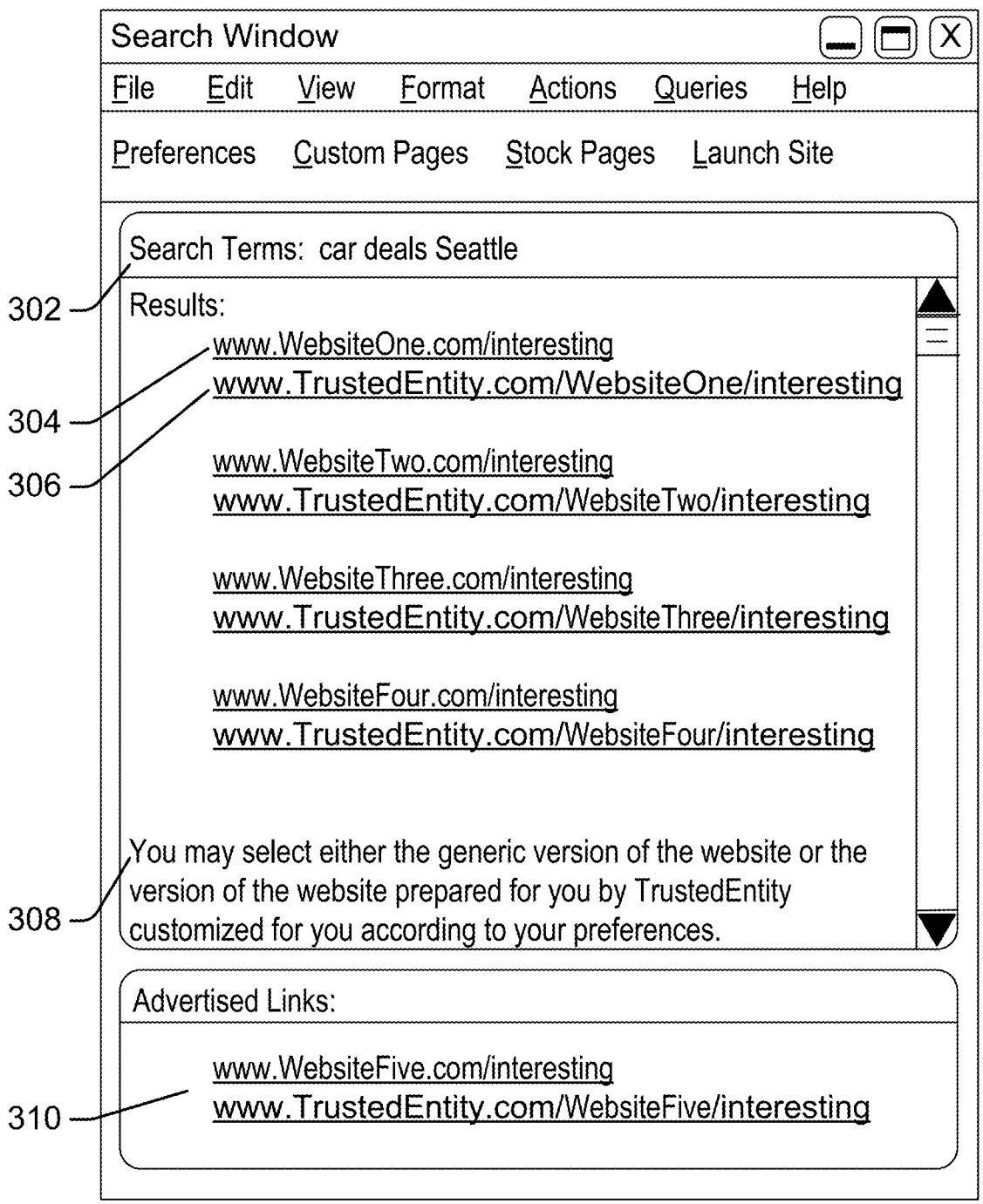
FIG. 3 is an example of a user interface, which may be used by a trusted entity when responding to a user after a user-initiated search. The user interface may provide the user with a choice between custom and non-custom content.

FIG. 3 is an example of a user interface 300, which may be used by a trusted entity when responding to a user after a user-initiated search. The user interface may provide the user (e.g., operator of the client device 204 of FIG. 2) with a choice between custom and non-custom content. The example user interface 300 indicates search terms 302 entered by the user. In response to the search terms, the trusted entity and/or search engine may provide one or more pairs of links to websites. A first link 304 in a first pair of webpages is a URL to a non-custom webpage 224, as seen in the example of FIG. 2. A second link 306 is a URL to a customized webpage 226, also seen in the example of FIG. 2. The customized website may have been constructed using the customizable content 214 of FIG. 2. In particular, the raw content 216, permissible customizations 218 and framework (s) 220 may have been utilized by the trusted entity 202 to create a website and/or webpage that is consistent with the preferences 208 (also seen in FIG. 2) of the user. Optionally, instructions 308 indicate that user may select either the non-custom ("generic") version of the website/webpage, or the version customized by the trusted entity. A further option, an area 310 is provided for advertised links. The advertised links may be directed to generic and/or custom websites and/or webpages.

Example Flow Diagrams

FIGS. 4-8 are flow diagrams illustrating example processes for content customization with security for client preference. The example processes of FIGS. 4-8 can be understood in part by reference to the configurations of FIGS. 1-3. However, FIGS. 4-8 contain general applicability, and are not limited by other drawing figures and/or prior discussion.

Figure 4:
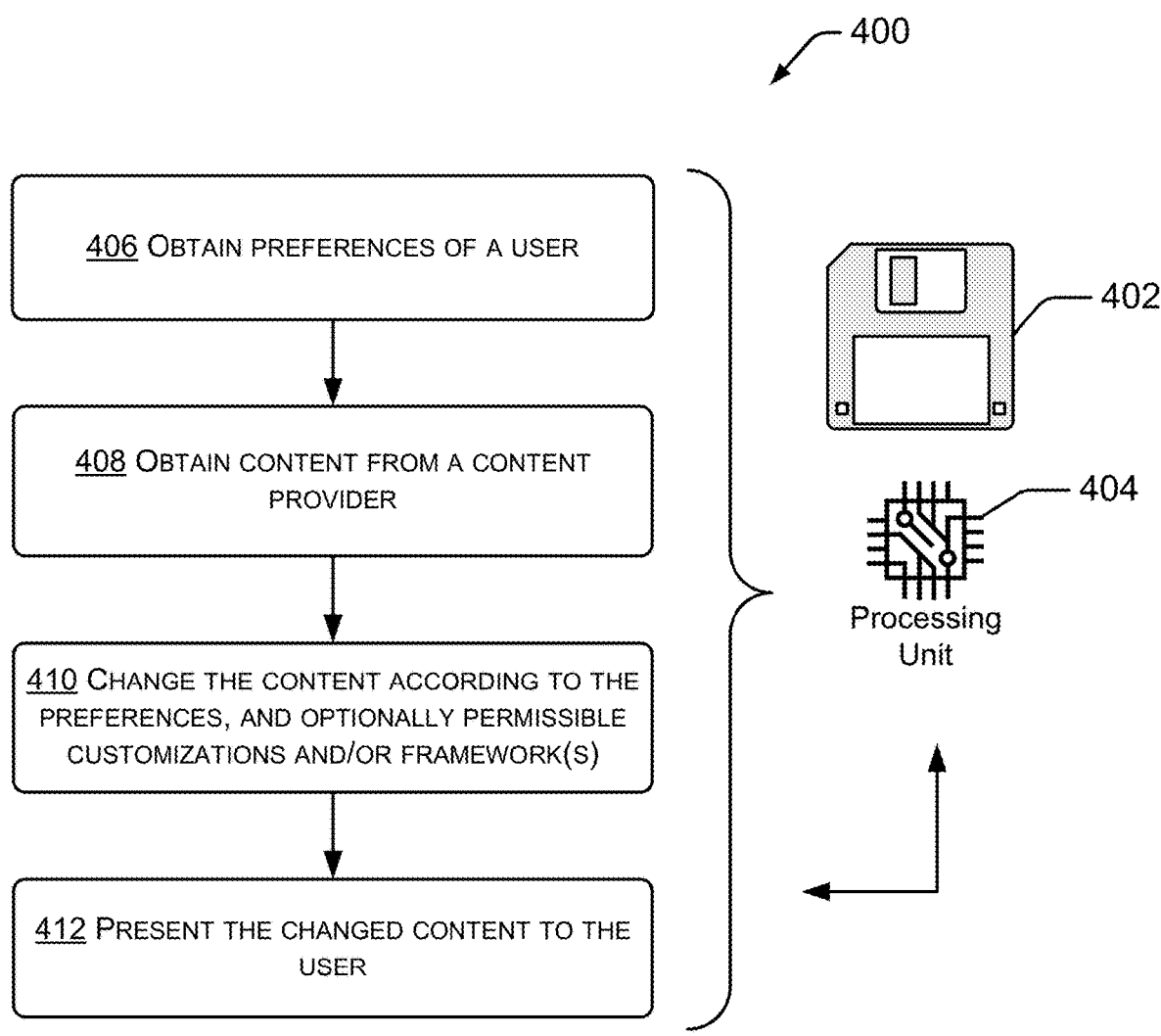
FIG. 4 is a flow diagram illustrating an example process for content customization with security for client preferences.

Each process described herein is illustrated as a collection of blocks or operations in a logical flow graph, which represent a sequence of operations that can be implemented in hardware, software, or a combination thereof. In the context of software, the operations represent computer-executable instructions stored on one or more computer-readable storage media 402 that, when executed by one or more processors 404, perform the recited operations. Such storage media 402, processors 404 and computer-readable instructions can be located within a content customization system (e.g., system 100 of FIG. 1 or system 200 of FIG. 2) according to a desired design or implementation. The storage media 402 seen in FIG. 4 is representative of storage media generally, both removable and non-removable, and of any technology. Thus, the recited operations represent actions, such as those described in FIGS. 4-8, and are taken under control of one or more processors configured with executable instructions to perform actions indicated. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. The computer- and/or processor-executable instructions may include, among others: storing, in a memory communicatively coupled to a processor, computer-executable instructions; executing the instructions on the processor; and according to the instructions being executed, performing one or more methods described herein. The above discussion may apply to any system, flow and processes illustrated and/or described herein.

In contrast, communication media may embody computer-readable instructions, data structures, program modules, or other data in a modulated data signal, such as a carrier wave, or other transmission mechanism. As defined herein, computer storage media does not include communication media.

FIG. 4 is a flow diagram 400 illustrating an example process or operation for website customization, which provides security for client preferences. At operation 406, preferences are obtained from the user. The preferences may be obtained by a trusted entity, such as trusted entity 202 of FIG. 2. The preferences may alternatively be obtained by a multiple purpose entity, such as the search service 112 of FIG. 1. The preferences generally include information describing characteristics of the user that would facilitate the customization of a website and/or webpage to provide better value to the user. In the example of FIG. 1, the preferences 108 may include user data, such as explicit preferences, implicit preferences, location data and/or demographic data. The preferences may be obtained from the user by means of a questionnaire, or by other means, such as observation and/or monitoring of user actions, which indicate preferences implicitly or by inference.

At operation 408, content is obtained from a content provider. In one example, the trusted entity (e.g., trusted entity 202 of FIG. 2) is configured as a search engine. Accordingly, the trusted entity may receive a search term from the user from whom preferences were previously received. Using the search term, the trusted entity may perform a search of the Internet (or other network) and may locate a content provider having a webpage and/or website consistent with the search term. Accordingly, the content may be obtained from the content provider.

At operation 410, the content may be changed according to the preferences of the user. The content may be changed according to two general considerations. First, the permissible customizations (if any) decreed by the content provider must be obeyed. Second, the preferences of the user may be considered when changing the content. In one example, a goal would be to change the content to conform to the preferences of the user to the degree possible, while still conforming to the permissible customizations decreed by the content provider. Referring to the example of FIG. 2, the content provider 206 provides the customizable content 214 to the trusted entity 202. The customizable content 214 may include raw content 216, permissible customizations 218 and one or more frameworks 220. The permissible customizations 218 and framework(s) 220 may be used to guide and to limit a degree to which the raw content 216 is customized in an attempt to better suit the content to the preferences 208 of the user.

At operation 412, the changed content is presented to the user and/or client device. In the example of FIG. 3, a user interface 300 allows the trusted entity to provide the content to the user in a format wherein the user may select link(s) 304 to the original, i.e., "generic," content that has not been modified. Alternatively, the user may select link(s) 306 to customized content, which has been customized to suit the preferences of the user to the degree possible in view of permissible customizations and/or frameworks (if any) required by the content provider.

Figure 5:
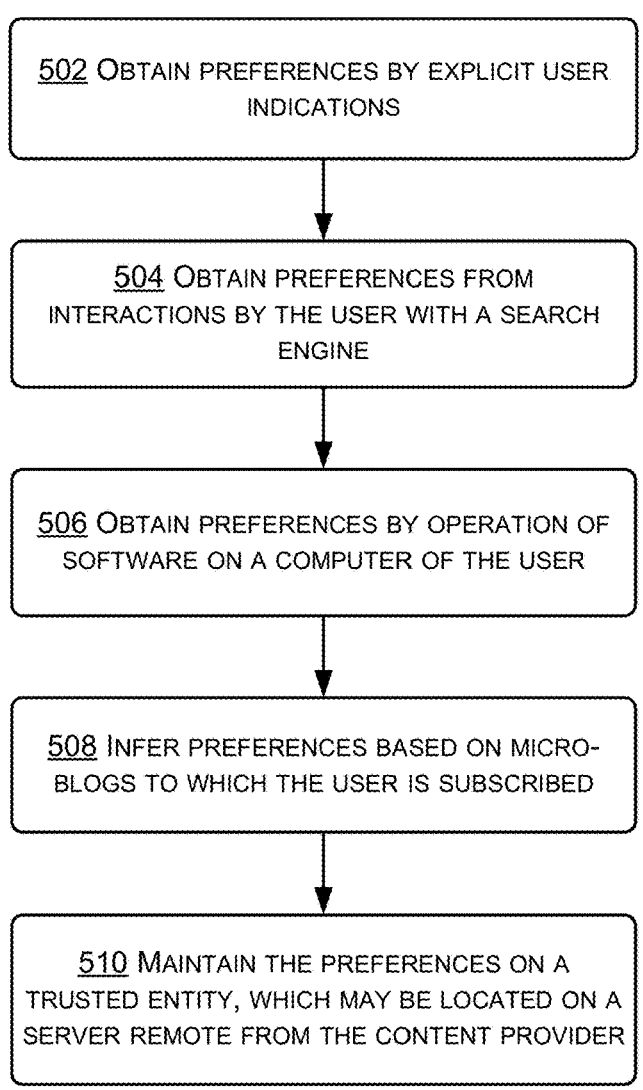
FIG. 5 is a flow diagram illustrating a plurality of example processes by which user preferences may be obtained, wherein the example processes can be performed singly or in combination with others of the example processes.

FIG. 5 is a flow diagram 500 illustrating a plurality of example processes or operations by which user preferences may be obtained, wherein one or more of the example processes can be performed singly or in combination with others of the example processes. While the example processes by which user preferences may be obtain is enumerated and ordered, no particular order and/or requirement that any or all of the processes be used is intended or implied.

At operation 502, preferences are obtained by explicit user indications. In the example of FIG. 2, the user and/or client device 204 sends preferences 208 to the trusted entity. In one implementation of the example, the user may have explicitly filled out a form or questionnaire provided by the trusted entity. Accordingly, the user's explicit preferences 208 may be provided to the trusted entity 202.

At operation 504, preferences are obtained from interactions by the user with a search engine. In the example of FIG. 2, the user and/or client device 204 may have a history of interacting with the trusted entity 202. If the trusted entity is configured to include search engine capability, the search engine may have acquired considerable data about the user, presumable with the user's permission. This data may be used to derive preferences, explicitly, implicitly or otherwise. For example, searches on different Caribbean vacations may imply an interest and/or preference in this area, while lack of searches on European destinations may imply and/or implicitly suggest a lack of interest and/or preference in this area. Accordingly, the trusted entity may obtain preferences from the user by the user's interactions with the search engine functionality of the trusted entity. The preference may be obtained by deduction, assumption, omission or other strategies.

At operation 506, preferences are obtained by operation of software on a computer of the user. In one example, the trusted entity may provide the user or client device with software to monitor the user's action, and to generate a profile of the user, including the preferences of the user.

At operation 508, preferences of the user may be inferred, at least in part, by micro-blogs to which the user subscribes. Micro-blogs may include "Tweets" that are common at this time as a means of either generating a following, or becoming informed, etc. Since a wide range of micro-blogs cover a wide range of subject matter, the micro-blogs to which a user subscribes may indicate preferences of the user.

At operation 510, the preferences of the user may be maintained by, and/or located on storage controlled by, the trusted entity. The trusted entity may be configured together with a search engine, or may be located in another location. Typically, the trusted entity is located separately from the user and the content provider. By locating the preferences separately from the content provider, the confidentiality of the preferences may be maintained. By combining storage of the preferences with search engine functionality, the trusted entity is able to change and configure content obtained from the content provider.

Figure 6:
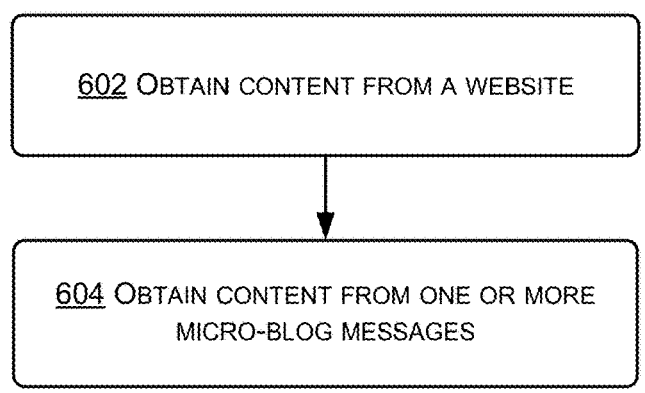
FIG. 6 is a flow diagram illustrating a plurality of example processes by which content may be obtained, wherein the example processes can be performed singly or in combination with others of the example processes.

FIG. 6 is a flow diagram 600 illustrating a plurality of example processes or operations by which content may be obtained, such as from a content provider. The content may be any type of data, such as text, graphics, audio, video and others. The example processes of FIG. 6 are intended by way of example only, and should not be considered to be required and/or limiting examples. Moreover, content can be acquired by one or more processes, performed singly or in combination with other processes, including the example processes in diagram 600. As indicated with respect to FIG. 4, once obtained, the content may be changed as indicated by preferences of the user.

At operation 602, content is obtained form a website. In the example of FIG. 2, the content provider 206 may be a website, and the content may include news, information, text, audio, video, etc.

At operation 604, the content may be obtained from one or more micro-blog messages, such as "tweets."

Figure 7:
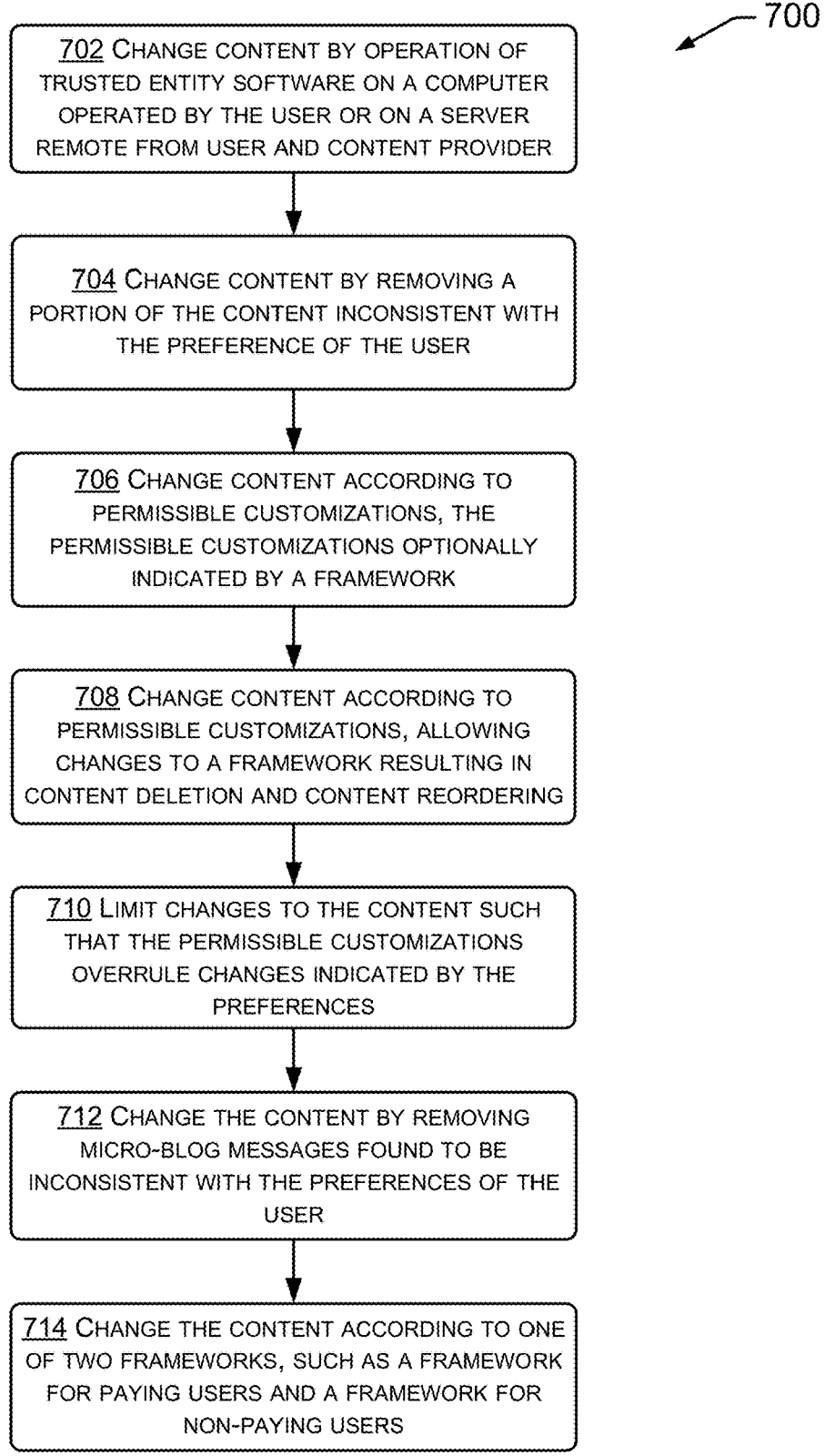
FIG. 7 is a flow diagram illustrating a plurality of example processes by which content may be changed, wherein the example processes can be performed singly or in combination with others of the example processes.

FIG. 7 is a flow diagram 700 illustrating a plurality of example processes or operations by which content may be changed, wherein the example processes can be performed singly or in combination with others of the example processes. In one example, the content is changed according to the preferences of the user, thereby increasing a value of the content to the user.

At operation 702, content is changed by operation of trusted entity software on a computer operated by the user or on a server remote from the user and content provider. Referring to the example of FIG. 2, the content may be changed by the trusted entity 202, in a manner consistent with the preferences of the user. However, the trusted entity 202 can be located in any of a plurality of locations. The trusted entity 202 may be located on a server distinct from the client device 202, the content provider 206 or a search engine. Alternatively, the trusted entity 202 may be located on the client device 204 or a server associated with the content provider 206. And as a still further alternative, the trusted entity 202 may be located on a server, and/or plurality of servers, associated with a search engine. Thus, while the trusted entity 202 is shown as a separate entity, it could be operated on any of several devices.

At operation 704, content may be changed by removing a portion of the content inconsistent with preference of the user. In one example, if the user's preferences indicate no interest in some topic (e.g., celebrity news) then content related to that topic may be removed from the content prior to delivery to the user's device. Similarly, the arrangement—such as on a framework—of the content may be changed, such as to accommodate removal of some content or reordering content to accommodate priorities within the preferences of the user.

At operation 706, content may be changed according to permissible customizations, such as indicated by the content provider. In one example, the permissible customizations may be indicated and/or imposed, at least in part, by the use of framework(s) upon which content may be attached or located. Such frameworks may impose some organization on the content, and thereby cause its presentation to conform to the permissible customizations indicated by the content provider.

At operation 708, content may be changed according to permissible customizations, allowing changes to a framework resulting in content deletion and content reordering. Referring to the example of FIG. 2, the framework(s) 220 may be provided with the customizable content 214, and provide constraint(s) that govern, and/or provide at least some limitations on, the degree to which content may be changed and/or customized. In one example, the preferences of the user may indicate dislike for certain content. Accordingly, content may be changed by eliminating this content from the customizable content 214. In another example, the preferences of the user may indicate preference for certain content. Accordingly, the content may be reordered to more prominently display the preferred content, while less prominently displaying the less favored content.

At operation 710, changes to the content are limited, such that the permissible customizations overrule changes indicated by the preference. Referring again to the example of FIG. 2, the user may provide preferences 208 to the trusted entity 202. Additionally, the content provider 206 may provide permissible customizations 218 and/or framework(s) 220 to the trusted entity. In two different scenarios, conflicts between the desires of the user 204 and the rules of the content provider 206 may be resolved in favor of one or the other. In particular, the content provider 206 may decline to provide content unless the permissible customizations 218 and/or framework(s) 220 are observed.

At operation 712, the content may be changed by removing micro-blog messages found to be inconsistent with the preference of the user. Thus, a user may "follow" the micro-blog messages (e.g., "tweets") of a content provider. However, only some of the messages may be of interest to the user, while others may be undesired by the user. The content may be filtered and/or changed to remove the undesirable messages. For example, the preferences may be applied to change the micro-blog content to remove messages about drug use, while allowing messages about music.

At operation 714, the content may be changed according to one of two or more frameworks, such as a framework for paying users and a framework for non-paying users. Referring again to the example of FIG. 2, the content provider 206 provides customizable content 214 that may include permissible customizations 218 and framework(s) 220. The content provider 206 may desire to impose one set of permissible customizations 218 and framework(s) 220 on non-paying customers and a different set of permissible customizations 218 and framework(s) 220 on paying customers. For example, the permissible customizations 218 and framework(s) 220 may impose advertisements on non-paying customers, but not on paying customers.

Figure 8:
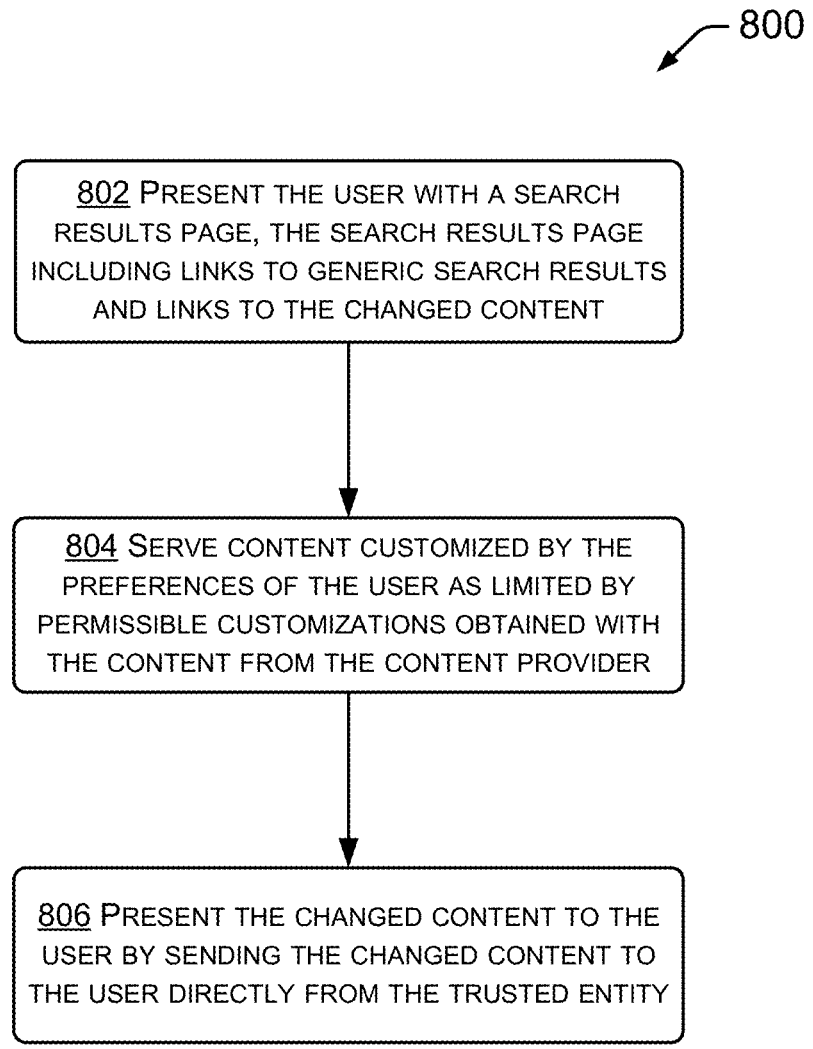
FIG. 8 is a flow diagram illustrating a plurality of example processes by which content may be served and/or presented to the user, wherein the example processes can be performed singly or in combination with others of the example processes.

FIG. 8 is a flow diagram 800 illustrating a plurality of example processes by which content may be presented and/or served to the user at the client device. The example processes may be performed singly or in combination with others of the example processes. In one example, options for both generic and customized content are provided to the user at the client device.

At operation 802, the user is presented with a search results page. The search results page may include links to generic search results and links to the changed content. Referring to the example of FIG. 3, a search term 302 may result in search results, including links 304 to generic search results and links 306 to changed and/or customized content. The changed and/or customized content may be changed and/or customized according to the preferences of the user, as expressed to the trusted entity.

At operation 804, content may be served to the user at the client device that has been customized by preferences of the user, as limited by permissible customizations obtained with the content from the content provider. Referring to the example of FIG. 2, the search results 222 includes both generic content 224 and customized content 226.

At operation 806, the changed content is presented to the user and/or client device by sending the changed content to the user directly from the trusted entity. Referring to the example of FIG. 2, the trusted entity 202 sends search results 222 to the client device 204. The search results 222 may include links to both content 224 and/or customized content 226. In the event that the user 204 requests customized content 226, that customized content may be generated by the trusted entity 202 according to the preferences 208 of the user and the permissible customizations 218 and framework(s) 220 of the content provider 206. The customized content may then be downloaded from the trusted entity to the user.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method implemented at least in part by a trusted entity, comprising:
   under control of one or more processors configured with executable instructions:
   receiving a search query from a user;
   observing previous search queries associated with the user;
   obtaining preferences of the user implicitly based at least in part on the previous search queries associated with the user; wherein the preferences comprise interests of the user;
   obtaining a webpage associated with the search query from a content provider separate from the trusted entity, the webpage from search results obtained from the content provider in response to the search query;
   obtaining permissible customizations from the content provider, wherein the permissible customizations include a framework having at least one location of the webpage to which content must be attached and having at least one location to which content of the webpage may optionally be attached;
   serving a computer operated by the user with a pair of links in a user interface of a display associated with the computer operated by the user, the pair of links comprising a first link to a modified webpage and a second link to the webpage before removal of the content of the webpage; and
   in response to the user selecting the first link, removing content of the webpage associated with the search query according to the preferences to generate a modified webpage while keeping the preferences unavailable to the content provider and limiting modifications made to the webpage according to the permissible customizations and serving the modified webpage to the computer.

2. The method as recited in claim 1, wherein obtaining preferences further comprises:
   obtaining preferences by explicit indications from the user.

3. The method as recited in claim 1, wherein:
   obtaining preferences is performed by software operating on a computer operated the user; and removing the content is performed by software operating on the computer operated by the user.

4. The method as recited in claim 1, wherein obtaining preferences of the user further comprises:
inferring preferences based on micro-blogs to which the user is subscribed.

5. The method as recited in claim 1, wherein:
obtaining the webpage includes obtaining a plurality of micro-blog messages;
removing the content includes removing one or more of the obtained micro-blog messages based on the preferences of the user; and
outputting the modified webpage includes allowing passage of an obtained micro-blog message based on the preferences of the user.

6. The method as recited in claim 1, wherein removing the content of the webpage further comprises:
populating a framework with content of the webpage based on the preferences of the user as constrained by the permissible customizations obtained from the content provider.

7. The method as recited in claim 1, wherein obtaining preferences of the user further comprises:
obtaining likes of the user by receipt of explicit and implicit actions by the user.

8. The method as recited in claim 1, wherein keeping the preferences unavailable to the content provider comprises:
maintaining the preferences on the trusted entity, the trusted entity located on a server remote from the content provider.

9. The method as recited in claim 1, wherein:
obtaining the webpage from the content provider includes obtaining the webpage from a website;
modifying the webpage includes formatting or arranging, at the trusted entity, a portion of the content of the webpage; and
presenting the modified webpage to the user includes sending the modified webpage from the trusted entity to the user.

10. A system comprising:
one or more processors;
one or more computer-readable media storing instructions executable by the one or more processors; wherein the instructions program the one or more processors to perform acts comprising:
observing actions of a user with a search engine;
deriving preferences of the user implicitly from the observed actions, wherein the preferences comprise demographic information of the user;
receiving, at a trusted entity, a request for a webpage;
obtaining the webpage from a content provider separate from the trusted entity;
obtaining permissible customizations from the content provider, wherein the permissible customizations include a framework having at least one location of the webpage to which content must be attached and having at least one location to which content of the webpage may optionally be attached;
serving a computer operated by the user with a pair of links in a user interface of a display associated with the computer operated by the user, the pair of links comprising a first link to a modified webpage and a second link to the webpage before removal of the content of the webpage; and
in response to the user selecting the first link, removing content of the webpage associated with the request according to the derived preferences to generate a modified webpage while keeping the preferences unavailable to the content provider and according to the permissible customizations governing display of the modified webpage and serving the modified webpage to the computer.

11. The system as recited in claim 10, wherein the permissible customizations allow changes to content attached to a framework, the allowed changes resulting in content deletion and content reordering.

12. The system as recited in claim 10, wherein the permissible customizations comprise a first framework that allows a first level of content customization according to user preferences and a second framework that allows a second level of content customization according to user preferences, the first level of content customization providing more accommodation to the user preferences than the second level of content customization, and the method further comprising serving only one of the first framework and the second framework to the computer operated by the user.

13. The system as recited in claim 10, further comprising:
receiving a request for a subscription to a micro-blogging feed; and
filtering the micro-blog feed according to the permissible customizations.

14. A device comprising:
one or more processors;
one or more computer-readable media storing instructions executable by the one or more processors, wherein the instructions program the one or more processors to perform acts comprising:
receiving a search query from a user;
observing previous search queries associated with the user;
obtaining preferences of the user implicitly based at least in part on the previous search queries associated with the user; wherein the preferences comprise interests of the user;
obtaining a webpage associated with the search query from a content provider separate from the trusted entity, the webpage returned as part of search results obtained from the content provider in response to the search query;
obtaining permissible customizations from the content provider, wherein the permissible customizations include a framework having at least one location of the webpage to which content must be attached and having at least one location to which content of the webpage may optionally, be attached;
serving a computer operated by the user with a pair of links in a user interface of a display associated with the computer operated by the user, the pair of links comprising a first link to a modified webpage and a second link to the webpage before removal of the content of the webpage; and
in response to the user selecting the first link, removing content of the webpage associated with the search query according to the preferences to generate a modified webpage and while keeping the preferences unavailable to the content provider and limiting modifications made to the webpage according to the permissible customizations, and serving the modified webpage to the computer.

* * * * *